United States Patent
Brockners et al.

(10) Patent No.: US 12,113,663 B1
(45) Date of Patent: Oct. 8, 2024

(54) UNJOINING AND REJOINING CLUSTERS IN COMPUTING NETWORKS

(71) Applicant: Cisco Technology, Inc., San Jose, CA (US)

(72) Inventors: Frank Brockners, Cologne (DE); Trevor George Smith, Leatherhead (GB); Sándor Szilárd Magyari, Budapest (HU); Marco Trinelli, Lausanne (CH); Tal Maoz, Jerusalem (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/446,272

(22) Filed: Aug. 8, 2023

(51) Int. Cl.
H04L 41/0659 (2022.01)
H04L 41/0654 (2022.01)
H04L 43/0811 (2022.01)
H04L 67/10 (2022.01)

(52) U.S. Cl.
CPC ...... H04L 41/0654 (2013.01); H04L 43/0811 (2013.01); H04L 67/10 (2013.01)

(58) Field of Classification Search
None
See application file for complete search history.

(56) References Cited

U.S. PATENT DOCUMENTS

| 7,496,782 | B1 | 2/2009 | Kownacki |
| 2003/0204786 | A1 | 10/2003 | Dinker et al. |
| 2012/0166866 | A1* | 6/2012 | Rao ............... G06F 11/2028 714/E11.073 |
| 2012/0179771 | A1* | 7/2012 | Ganti ............... G06F 9/45558 709/213 |
| 2019/0065241 | A1 | 2/2019 | Wong et al. |
| 2019/0173739 | A1* | 6/2019 | Cui ............... H04L 45/02 |
| 2020/0410284 | A1* | 12/2020 | Kallanagoudar ... G06F 11/2035 |
| 2022/0329481 | A1 | 10/2022 | Nelson et al. |
| 2023/0104568 | A1* | 4/2023 | Miriyala ............... G06F 9/5072 718/104 |

FOREIGN PATENT DOCUMENTS

CN 113268337 A 8/2021

OTHER PUBLICATIONS

Gallo A., "How to Ping Monitoring between Kubernetes Nodes", May 2020, 12 Pages.

* cited by examiner

*Primary Examiner* — June Sison
(74) *Attorney, Agent, or Firm* — Baker Botts L.L.P.

(57) ABSTRACT

A method for unjoining and rejoining clusters of computing nodes in edge site computing networks to reduce the impact of interruption to connectivity between computing nodes is presented. The method includes accessing a cluster of computing nodes executing on an edge site computing network. The cluster of computing nodes includes a plurality of follower computing nodes and a leader computing node. The method further includes detecting an interruption to connectivity established between the leader computing node and one or more of the plurality of follower computing nodes. In response to detecting the interruption to connectivity, the method includes bifurcating the cluster of computing nodes into a first subcluster of computing nodes and a second subcluster of computing nodes. In response to detecting a restoration of connectivity, the method includes recombining the first subcluster of computing nodes and the second subcluster of computing nodes.

20 Claims, 5 Drawing Sheets

US 12,113,663 B1

UNJOINING AND REJOINING CLUSTERS IN COMPUTING NETWORKS

TECHNICAL FIELD

This disclosure relates generally to computing networks, and, more specifically, to unjoining and rejoining clusters in computing networks.

BACKGROUND

Computing management platforms and networks, such as Kubernetes®, typically deploy, scale, and manage containerized applications at edge sites. For example, such management platforms and networks platforms may group virtual and/or physical resources into clusters. The clusters may each include one or more follower computing nodes and a designated leader computing node that controls the cluster and the one or more follower computing nodes. Specifically, the clusters may be responsible for hosting and supporting one or more applications executing at respective edge sites. In some instances, at a particular edge site, for example, computing nodes of a cluster may be susceptible connectivity interruptions. For example, connectivity between a leader computing node and a follower computing node of cluster may be interrupted. In such instances, the cluster may lose its ability to fully function or to become decommissioned.

DESCRIPTION OF EXAMPLE EMBODIMENTS

Overview

Figure 1:
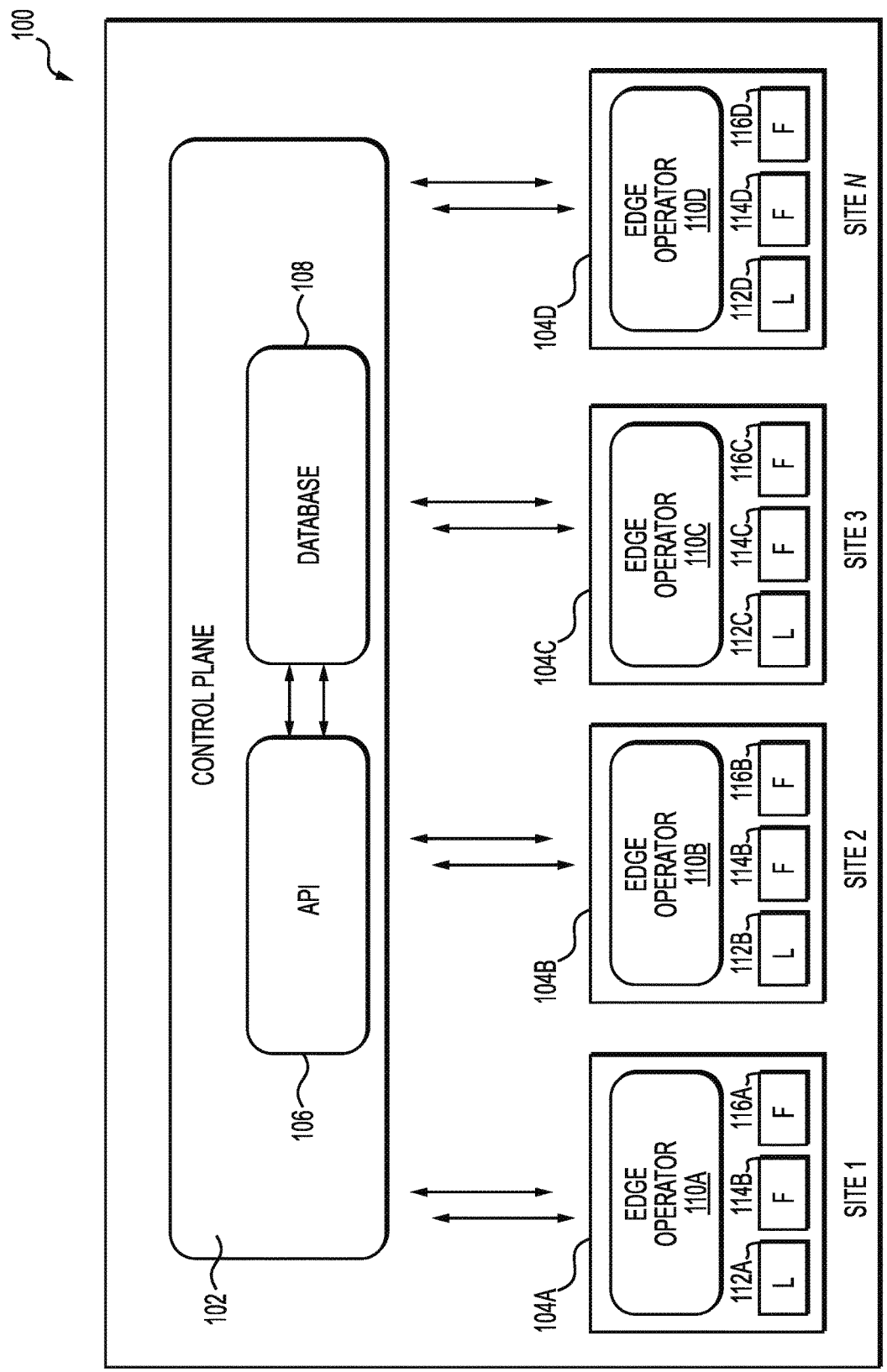
FIG. 1 illustrates an example edge-native computing network.

The present embodiments are directed to techniques for unjoining and rejoining clusters of computing nodes in edge site computing networks to reduce the impact of interruption to connectivity between computing nodes. In particular embodiments, one or more computing devices may access a cluster of computing nodes of one or more clusters of computing nodes executing on an edge site computing network. For example, in particular embodiments, the cluster of computing nodes may include a plurality of follower computing nodes and at least one leader computing node. In particular embodiments, the one or more computing devices may then detect an interruption to connectivity established between the at least one leader computing node and one or more of the plurality of follower computing nodes.

For example, in particular embodiments, prior to detecting the interruption to connectivity, the one or more computing devices may ping one or more of the plurality of follower computing nodes and the at least one leader computing node to determine whether a node-to-node connectivity exists therebetween. In particular embodiments, in response to detecting the interruption to connectivity, the one or more computing devices ma then bifurcate the cluster of computing nodes into a first subcluster of computing nodes and a second subcluster of computing nodes. In particular embodiments, each of the first subcluster of computing nodes and the second subcluster of computing nodes may include at least one follower computing node and a leader computing node. In particular embodiments, each of the first subcluster of computing nodes and the second subcluster of computing nodes may also include an edge operator configured to manage the at least one follower computing node and the leader computing node.

In particular embodiments, in response to detecting a restoration of connectivity with respect to one or more computing nodes associated with the first subcluster of computing nodes and the second subcluster of computing nodes, the one or more computing devices may then recombine the first subcluster of computing nodes and the second subcluster of computing nodes. In particular embodiments, prior to recombining the first subcluster of computing nodes and the second subcluster of computing nodes, the one or more computing devices may ping the one or more computing nodes associated with the first subcluster of computing nodes and the second subcluster of computing nodes to determine whether a node-to-node connectivity exists therebetween. In particular embodiments, the one or more computing devices may then detect the restoration of connectivity based on the pinging.

In particular embodiments, subsequent to bifurcating the cluster of computing nodes into the first subcluster of computing nodes and the second subcluster of computing nodes, the one or more computing devices may receive an intent from a control plane configured to manage each of the one or more clusters of computing nodes. In particular embodiments, the one or more computing devices may then instantiate the intent utilizing a first edge operator associated with the first subcluster of computing nodes and instantiate the intent utilizing a second edge operator associated with the second subcluster of computing nodes. In particular embodiments, each of the first subcluster of computing nodes and the second subcluster of computing nodes may execute on the edge site computing network.

In particular embodiments, the one or more computing devices may execute, based on the intent, an application utilizing the first subcluster of computing nodes or the second subcluster of computing nodes. In particular embodiments, the one or more clusters of computing nodes may include a plurality of clusters of computing nodes. In particular embodiments, the cluster of computing nodes may include a first cluster of computing nodes, and, in response to detecting the interruption to connectivity, the one or more computing devices may select a second cluster of computing nodes of the plurality of clusters of computing nodes. For example, in particular embodiments, the second cluster of computing nodes may be determined as having connectivity. In particular embodiments, at least a subset of computing nodes of the second cluster of computing nodes may be different from the first cluster of computing nodes.

Technical advantages of particular embodiments of this disclosure may include one or more of the following. Certain systems and methods described herein provide a technique for unjoining and rejoining clusters of computing nodes in edge site computing networks to reduce the impact of interruption to connectivity between computing nodes. For example, one or more computing devices may frequently ping and monitor node-to-node connectivity between leader computing nodes and follower computing nodes of a cluster of computing nodes at an edge site. Upon identifying an interruption to node-to-node connectivity, the one or more computing devices may bifurcate the cluster of computing nodes into subclusters of computing nodes utilizing, for example, computing nodes of the original cluster identified as having available node-to-node connectivity. The bifurcated subclusters of computing nodes may be then utilized to realize and implement intents and/or desired states suitable for executing applications at the edge site. In this way, by unjoining and rejoining clusters of computing nodes in edge site computing networks to reduce the impact of interruption to connectivity between computing nodes, the present embodiments may result in an overall improved efficiency, robustness, and reliability of edge site computing networks.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

FIG. 1 illustrates an example edge-native computing network 100, in accordance with the presently disclosed embodiments. In particular embodiments, the edge-native computing network 100 may include, for example, a cloud-based computing network that may be suitable for executing at edge locations (e.g., an edge site computing network that executes and performs in the same manner as a cloud-based computing network, but at an edge site). As depicted, in particular embodiments, the edge-native computing network 100 may include a control plane 102 and a number of clusters of computing nodes 104A, 104B, 104C, and 104D at respective edge sites (e.g., "Site 1," "Site 2," "Site 3," and "Site N"). In particular embodiments, the control plane 102 may include, for example, a software-defined network controller (e.g., SDN controller, software-defined wide area network (SD-WAN) controller) that may be suitable for controlling and managing data traffic, intents, applications, and rules and policies for routing data traffic throughout the edge-native computing network 100.

For example, as depicted, the control plane 102 may include an application programming interface (API) 106 and a database 108. In particular embodiments, the API 106 may be utilized to fetch intents and/or states stored to the database 108, and then feed the intents and/or states to the number of clusters of computing nodes 104A, 104B, 104C, and 104D at respective edge sites (e.g., "Site 1," "Site 2," "Site 3," and "Site N"). In particular embodiments, the number of clusters of computing nodes 104A, 104B, 104C, and 104D at respective edge sites (e.g., "Site 1," "Site 2," "Site 3," and "Site N") may each include an edge operator 110A, 110B, 110C, and 110D and a set of computing nodes, which may include one or more leader computing nodes 112A, 112B, 112C, and 112D and a number of follower computing nodes 114A, 114B, 114C, 114D, 116A, 116B, 116C, 116D.

For example, in particular embodiments, the edge operators 110A, 110B, 110C, and 110D may each include a software-defined local controller that may be suitable for controlling, managing, and organizing the number of respective clusters of computing nodes 104A, 104B, 104C, and 104D, as well as assigning follower and leader roles to the computing nodes 112A-112D, 114A-114D, and 116A-116D.

In some embodiments, the leader computing nodes 112A-112D may manage and keep track of workloads and tasks being executing between itself and the follower computing nodes 114A-114D, and 116A-116D.

In particular embodiments, during operation, the edge operators 110A, 110B, 110C, and 110D may each frequently poll the control plane 102 for intents and/or desired states. In particular embodiments, once the edge operators 110A, 110B, 110C, and 110D fetch intents and/or desired states from the control plane 102, the edge operators 110A, 110B, 110C, and 110D may then each realize and implement the intents and/or desired states locally within their respective clusters of computing nodes 104A, 104B, 104C, and 104D at respective edge sites (e.g., "Site 1," "Site 2," "Site 3," and "Site N"). In one particular example, an intent may include: "application 'A' is to be available at edge location Site 1 and Site 2." In such an instance, for example, the edge operators 110A and 110B may then realize and implement the intent by assigning the leader computing nodes 112A and 112B and follower computing nodes 114A, 114B, 116A, and 116B one or more workloads or tasks to execute to render the "application 'A'" available and executable at respective edge sites "Site 1" and "Site 2."

Figure 2A:
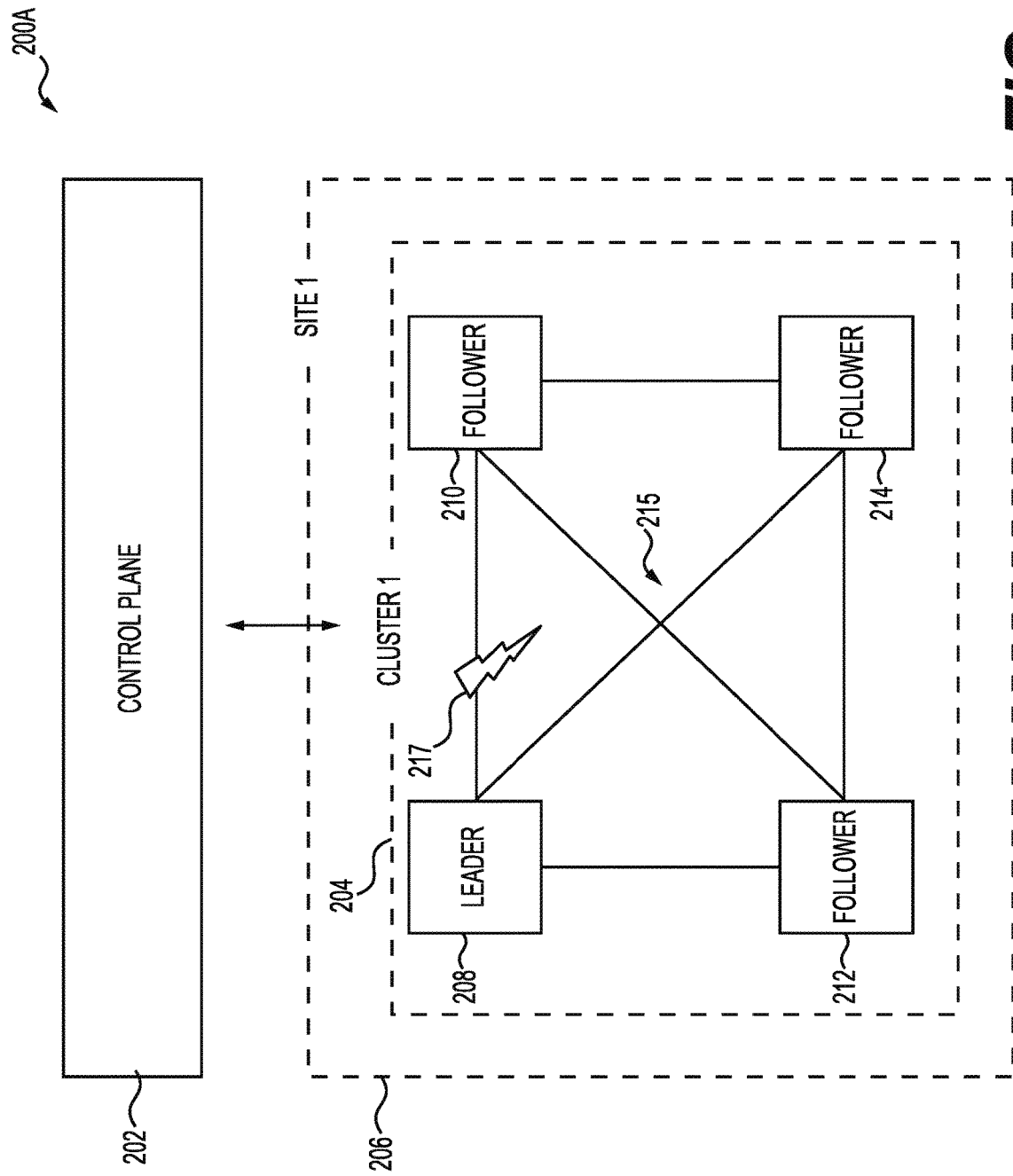
FIG. 2A illustrates a control plane and edge site cluster of computing nodes in which connectivity is interrupted between one or more computing nodes.

FIG. 2A illustrates a control plane and edge site cluster of computing nodes 200A in which connectivity is interrupted between one or more computing nodes, in accordance with the presently disclosed embodiments. In one embodiment, the control plane 202 may be tantamount to the control plane 102 as discussed above with respect to FIG. 1. In another embodiment, the control plane 202 may be tantamount to any one of the edge operators 110A. 110B, 110C, and 110D as discussed above with respect to FIG. 1. For example, the control plane 202 may control and manage a cluster of computing nodes 204 (e.g., "Cluster 1") at an edge site 206 (e.g., "Site 1"). As further depicted, the cluster of computing nodes 204 (e.g., "Cluster 1") may include a leader computing node 208 and a number of follower computing nodes 210, 212, and 214.

In accordance with the presently disclosed embodiments, the control plane 202 may frequently monitor and ping the leader computing node 208 and each of the number of follower computing nodes 210, 212, and 214 to determine whether node-to-node connectivity 215 (e.g., node-to-node wired connectivity and/or node-to-node wireless connectivity) exists between the leader computing node 208 and each of the number of follower computing nodes 210, 212, and 214 and/or between each of the number of follower computing nodes 210, 212, and 214. In particular embodiments, as further depicted by FIG. 2A, the control plane 202 may identify that node-to-node connectivity 215 is interrupted, for example, between the leader computing node 208 and the follower computing node 210 (e.g., as indicated by connectivity interruption icon 217).

In such an instance, without the presently disclosed embodiments as discussed below with respect to FIG. 2B, the ability of the cluster of computing nodes 204 (e.g., "Cluster 1") at the edge site 206 (e.g., "Site 1") to realize and implement intents and/or states and execute applications as desired would be otherwise compromised. Specifically, because such edge site computing clusters may include constraints, for example, that the leader computing node 208 and each of the number of follower computing nodes 210, 212, and 214 all have mutual reachability at the internet protocol (IP) level, any interruption to node-to-node connectivity 215 at the edge site 206 (e.g., "Site 1") may result in applications deployed at the edge site 206 (e.g., "Site 1") becoming malfunctional.

Figure 2B:
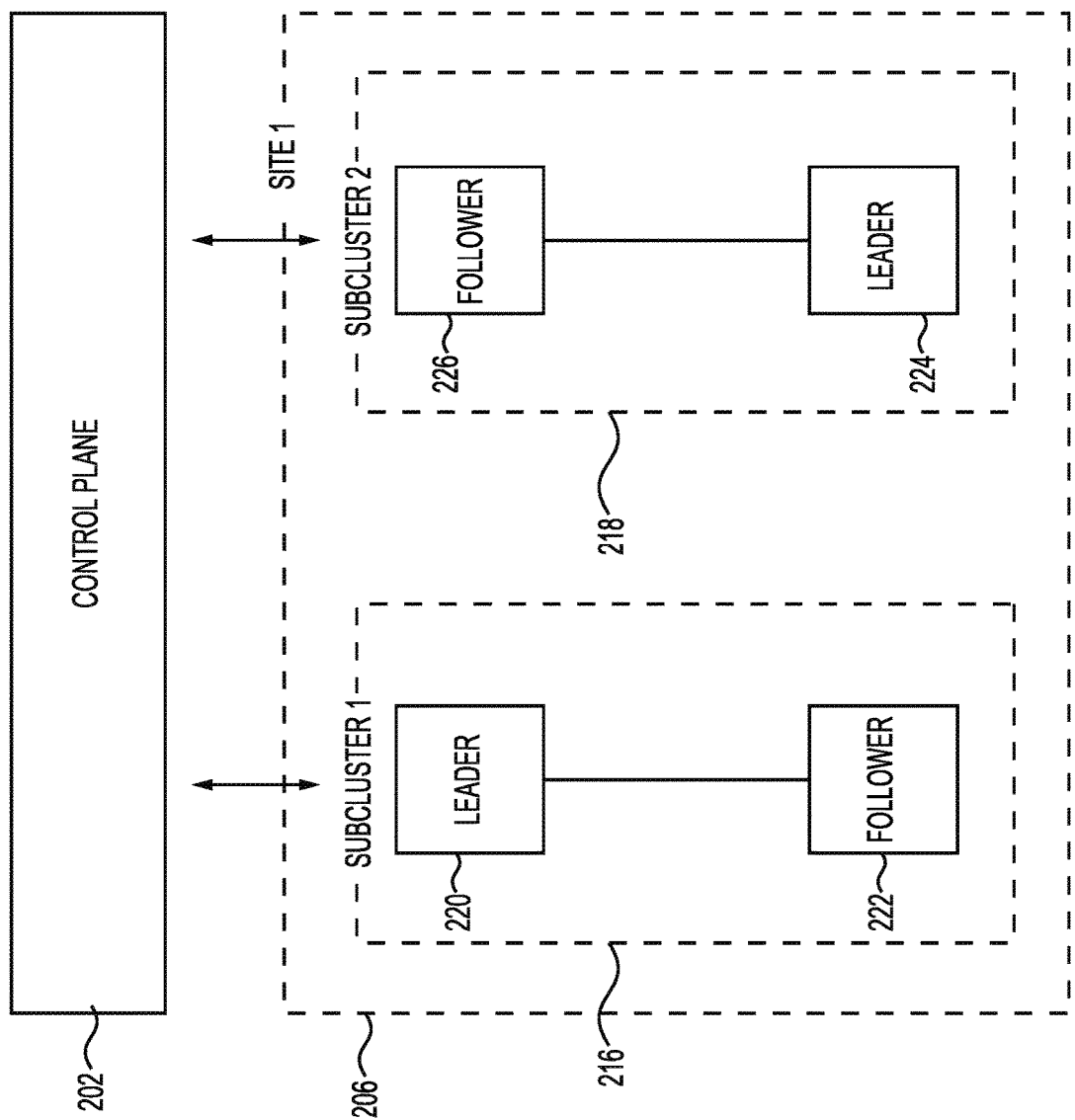
FIG. 2B illustrates a control plane and edge site cluster of computing nodes in which the cluster of computing nodes is bifurcated into subclusters.

FIG. 2B illustrates a control plane and edge site cluster of computing nodes 200A in which the cluster of computing nodes is bifurcated into subclusters, in accordance with the presently disclosed embodiments. As depicted in FIG. 2B, in particular embodiments, in response to the control plane 202 identifying node-to-node connectivity 215 is interrupted, for example, between the leader computing node 208 and the follower computing node 210, the cluster of computing nodes 204 (e.g., "Cluster 1") at the edge site 206 (e.g., "Site 1") may be bifurcated into a first subcluster of computing nodes 216 (e.g., "Subcluster 1") and a second subcluster of computing nodes 218 (e.g., "Subcluster 2").

For example, bifurcating (e.g., dividing) the cluster of computing nodes 204 (e.g., "Cluster 1") into the first subcluster of computing nodes 216 (e.g., "Subcluster 1") and the second subcluster of computing nodes 218 (e.g., "Subcluster 2") may include instantiating at the edge site 206 (e.g., "Site 1") subclusters of computing nodes, in which each of the first subcluster of computing nodes 216 (e.g., "Subcluster 1") and the second subcluster of computing nodes 218 (e.g., "Subcluster 2") includes a leader computing node 220, 224, a follower computing node 222, 226, and an edge operator suitable for managing and controlling the leader computing node 220, 224 and the follower computing node 222, 226. In some embodiments, the leader computing nodes 220 and 224 and the follower computing nodes 222 and 226 within the respective first subcluster of computing nodes 216 (e.g., "Subcluster 1") and second subcluster of computing nodes 218 (e.g., "Subcluster 2") may correspond to those computing nodes (e.g., computing nodes 212 and 214) determined to have available node-to-node connectivity.

While the present embodiments may be discussed herein primarily with respect to bifurcating (e.g., dividing into two subclusters) the cluster of computing nodes 204 (e.g., "Cluster 1") into the first subcluster of computing nodes 216 (e.g., "Subcluster 1") and the second subcluster of computing nodes 218 (e.g., "Subcluster 2), it should be appreciated that, in other embodiments, the cluster of computing nodes 204 (e.g., "Cluster 1") may be split into any number of subclusters. For example, in accordance with the presently disclosed embodiments, in response to the control plane 202 identifying node-to-node connectivity 215 is interrupted, the cluster of computing nodes 204 (e.g., "Cluster 1") may be divided into any N number of subclusters of computing nodes (e.g., 2, 3, 4, 5, or more subclusters of computing nodes).

In particular embodiments, upon bifurcating (e.g., dividing) the cluster of computing nodes 204 (e.g., "Cluster 1") into the first subcluster of computing nodes 216 (e.g., "Subcluster 1") and the second subcluster of computing nodes 218 (e.g., "Subcluster 2"), each of the subclusters 216 and 218 may then operate and perform as a singular cluster of computing nodes at the edge site 206 (e.g., "Site 1"). For example, referring again to an example intent, such as: "application 'A' is to be available at edge location Site 1 and Site 2," the edge operators of the each of the first subcluster of computing nodes 216 (e.g., "Subcluster 1") and the second subcluster of computing nodes 218 (e.g., "Subcluster 2") may each realize and implement the intent locally so at to render the "application 'A'" available and executable at the edge site 206 (e.g., "Site 1").

In particular embodiments, the control plane 202 may continue to monitor and ping the leader computing node 208 and the follower computing node 210 to determine whether node-to-node connectivity is restored and/or monitor node-to-node connectivity between one or more computing nodes 220, 222 of the first subcluster of computing nodes 216 (e.g., "Subcluster 1") and one or more computing nodes 224, 226 of the second subcluster of computing nodes 218 (e.g., "Subcluster 2). For example, in particular embodiments, the control plane 102 may monitor and ping for node-to-node connectivity between the leader computing node 220 and the follower computing node 222, the leader computing node 224 and the follower computing node 226, and/or between one or more of the leader computing node 220 and the follower computing node 222 and one or more of the leader computing node 224 and the follower computing node 226. In particular embodiments, upon detecting a restoration of node-to-node connectivity between the first subcluster of computing nodes 216 (e.g., "Subcluster 1") and the second subcluster of computing nodes 218 (e.g., "Subcluster 2), the first subcluster of computing nodes 216 (e.g., "Subcluster 1") and the second subcluster of computing nodes 218 (e.g., "Subcluster 2") may be then recombined into a singular cluster of computing nodes (e.g., recombined into the cluster of computing nodes 204 ("Cluster 1")).

In particular embodiments, in addition to, or alternative to, bifurcating (e.g., dividing) the cluster of computing nodes 204 (e.g., "Cluster 1") into the first subcluster of computing nodes 216 (e.g., "Subcluster 1") and the second subcluster of computing nodes 218 (e.g., "Subcluster 2"), in instances in which multiple clusters of computing nodes are included at the edge site 206 (e.g., "Site 1"), one or more clusters of computing nodes having node-to-node connectivity may be selected from the multiple clusters at the edge site 206 (e.g., "Site 1") to realize and implement a given intent and/or state. For example, in instances in which an N number of clusters of computing nodes are included at the edge site 206 (e.g., "Site 1"), the present embodiments may include a bootstrapping process in which an M number of clusters of computing nodes are utilized to realize and implement a given intent and/or state at the edge site 206 (e.g., "Site 1") in response to an interruption to node-to-node connectivity.

Figure 3:
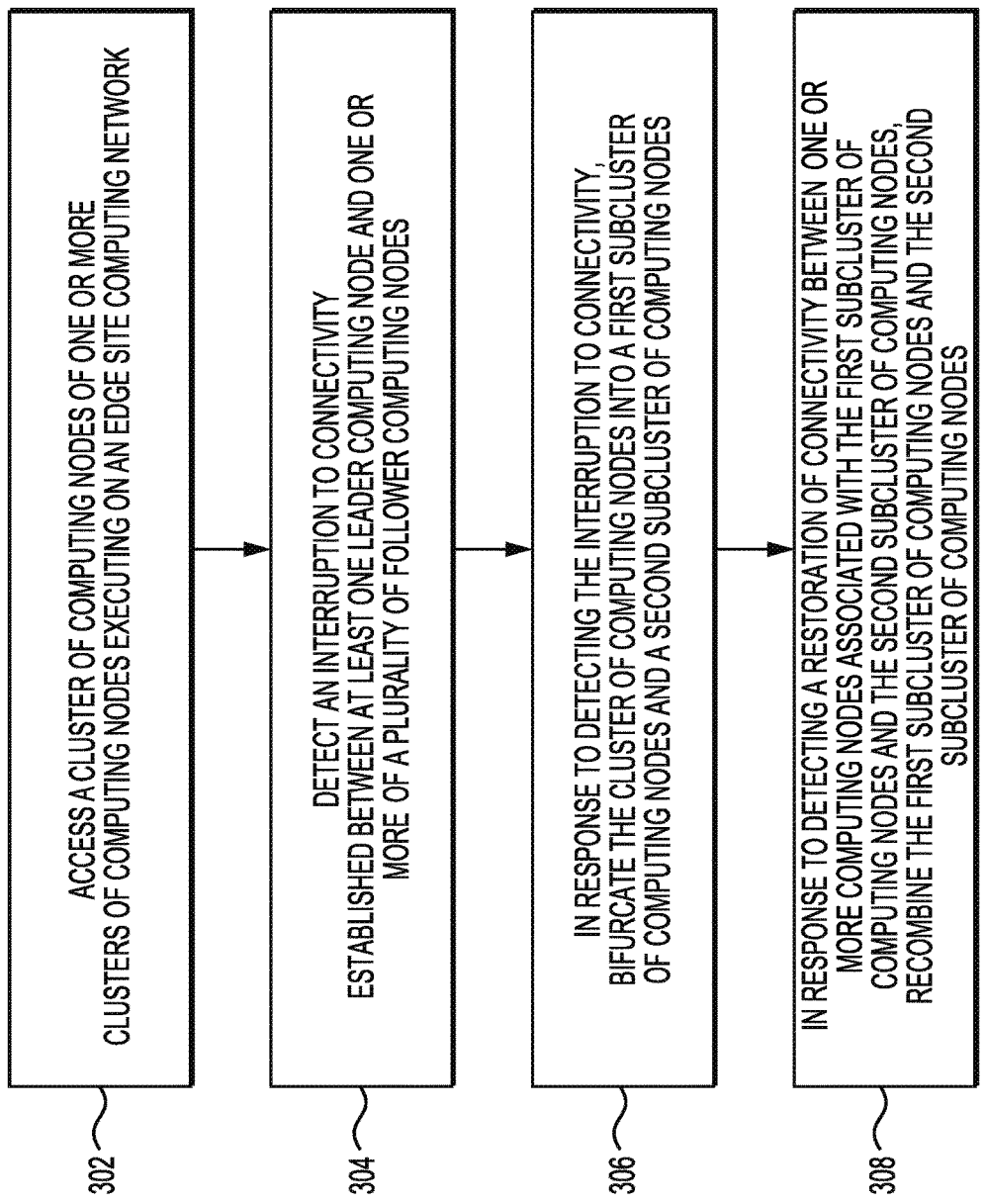
FIG. 3 illustrates a flow diagram of a method for unjoining and rejoining clusters of computing nodes in edge site computing networks to reduce the impact of interruption to connectivity between computing nodes.

FIG. 3 illustrates a flow diagram of a method 300 for unjoining and rejoining clusters of computing nodes in edge site computing networks to reduce the impact of interruption to connectivity between computing nodes, in accordance with the presently disclosed embodiments. The method 300 may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing intents and/or desire states), software (e.g., instructions running/executing on one or more processors), firmware (e.g., microcode), or any combination thereof.

The method 300 may begin at block 302 with one or more computing devices accessing a cluster of computing nodes of one or more clusters of computing nodes executing on an edge site computing network. For example, in particular embodiments, the cluster of computing nodes may include a number of follower computing nodes and a leader computing node. The method 300 may continue at block 304 with the one or more computing devices detecting an interruption to connectivity established between the leader computing node and one or more of the number of follower computing nodes. For example, in particular embodiments, the one or more computing devices may monitor and ping the leader computing node and the one or more of the number of follower computing nodes to determine whether a node-to-node connectivity is available.

The method 300 may continue at block 306 with the one or more computing devices, in response to detecting the interruption to connectivity, bifurcating the cluster of computing nodes into a first subcluster of computing nodes and a second subcluster of computing nodes. For example, in particular embodiments, to reduce the impact of interruption to connectivity between computing nodes, the one or more computing devices may automatically bifurcate (e.g., divide) the cluster of computing nodes into separate and independent subclusters each executing in conjunction and on the same edge site computing network. In particular embodiments, each of the subclusters of computing nodes may include leader and follower computing nodes and an edge operator suitable for managing and instantiating intents. Particularly, in accordance with the presently disclosed embodiments, as each of the subclusters of computing nodes still correspond to a single edge site, the control plane may provide intents to the edge operator of each subcluster and the edge operators may each instantiate the intent independently to ensure that all applications that are associated with the edge site are available in each of the subclusters.

The method 300 may conclude at block 308 with the one or more computing devices, in response to detecting a restoration of connectivity between the first subcluster of computing nodes and the second subcluster of computing nodes, recombining the first subcluster of computing nodes and the second subcluster of computing nodes. For example, in particular embodiments, the one or more computing devices may continue to monitor and ping the computing nodes of each subcluster to determine whether a node-to-node connectivity becomes available. Upon determining the node-to-node connectivity, the one or more computing devices may then recombine the first subcluster of computing nodes and the second subcluster of computing nodes.

Figure 4:
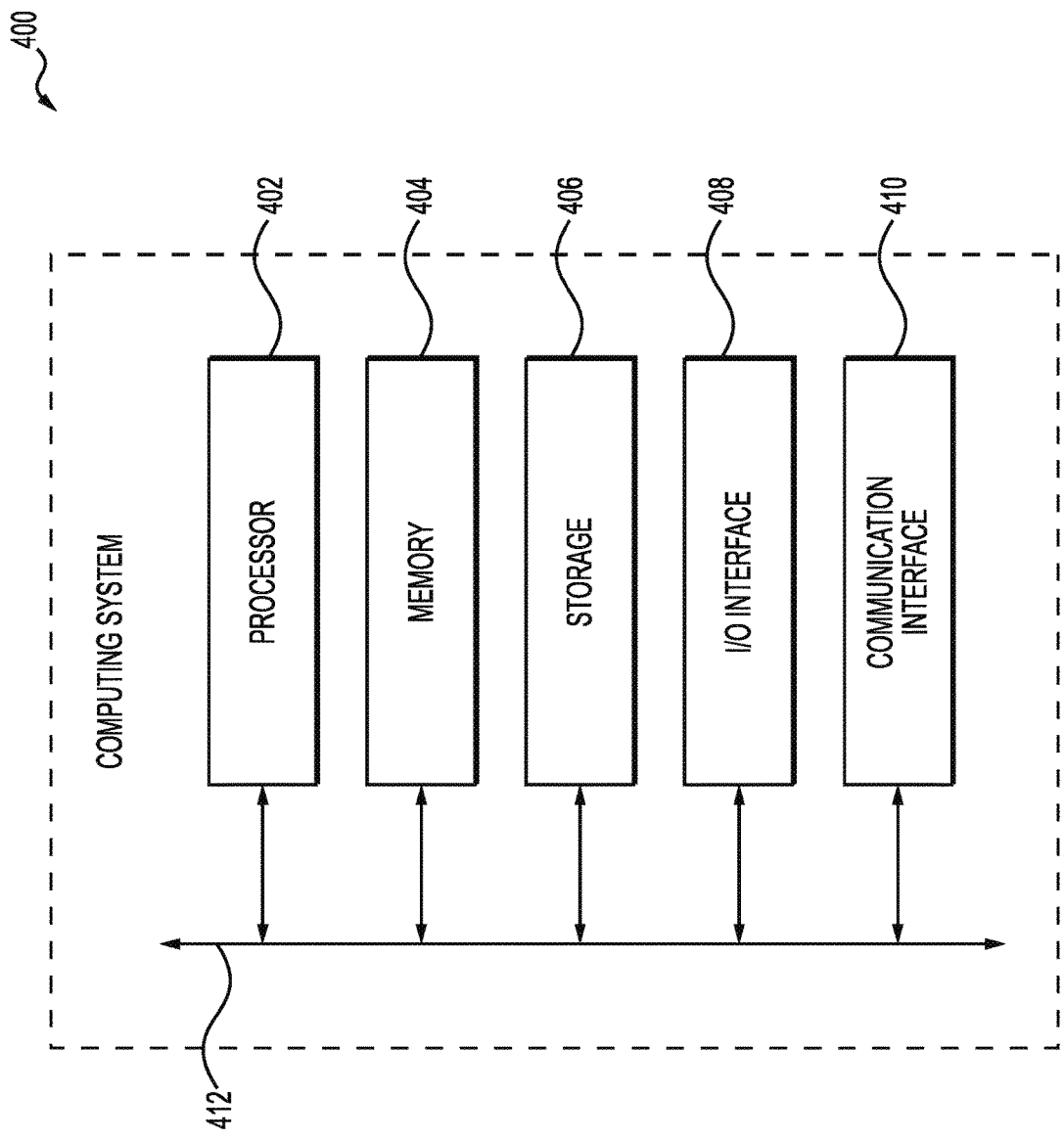
FIG. 4 illustrates an example computer system.

FIG. 4 illustrates an example computer system 400 that may be useful in performing one or more of the foregoing techniques as presently disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by one or more computing devices, comprising:
accessing a cluster of computing nodes of one or more clusters of computing nodes executing on an edge site computing network, wherein the cluster of computing nodes comprises a plurality of follower computing nodes and at least one leader computing node;
detecting an interruption to connectivity established between the at least one leader computing node and one or more of the plurality of follower computing nodes;
in response to detecting the interruption to connectivity established between the at least one leader computing node and one or more of the plurality of follower computing nodes within a same cluster, and while connectivity is established between the one or more of the plurality of follower computing nodes and one or more other computing nodes of the plurality of follower nodes within the same cluster, bifurcating the cluster of computing nodes into a first subcluster of computing nodes and a second subcluster of computing nodes; and
in response to detecting a restoration of connectivity with respect to one or more computing nodes associated with the first subcluster of computing nodes and the second subcluster of computing nodes, recombining the first subcluster of computing nodes and the second subcluster of computing nodes.

2. The method of claim 1, further comprising:
prior to detecting the interruption to connectivity, pinging one or more of the plurality of follower computing nodes and the at least one leader computing node to determine whether a node-to-node connectivity exists therebetween.

3. The method of claim 1, wherein each of the first subcluster of computing nodes and the second subcluster of computing nodes comprises at least one follower computing node and a leader computing node.

4. The method of claim 3, wherein each of the first subcluster of computing nodes and the second subcluster of computing nodes comprises an edge operator configured to control and manage the at least one follower computing node and the leader computing node.

5. The method of claim 1, further comprising:
subsequent to bifurcating the cluster of computing nodes into the first subcluster of computing nodes and the second subcluster of computing nodes:
receiving an intent from a control plane configured to manage each of the one or more clusters of computing nodes;
instantiating the intent utilizing a first edge operator associated with the first subcluster of computing nodes; and
instantiating the intent utilizing a second edge operator associated with the second subcluster of computing nodes.

6. The method of claim 5, wherein each of the first subcluster of computing nodes and the second subcluster of computing nodes is executing on the edge site computing network.

7. The method of claim 5, further comprising executing, based on the intent, an application utilizing the first subcluster of computing nodes or the second subcluster of computing nodes.

8. The method of claim 1, wherein the one or more clusters of computing nodes comprises a plurality of clusters of computing nodes, and wherein the cluster of computing nodes comprises a first cluster of computing nodes, the method further comprising:
in response to detecting the interruption to connectivity, selecting a second cluster of computing nodes of the plurality of clusters of computing nodes, the second cluster of computing nodes having connectivity.

9. The method of claim 8, wherein at least a subset of computing nodes of the second cluster of computing nodes is different from the first cluster of computing nodes.

10. The method of claim 1, further comprising:
prior to recombining the first subcluster of computing nodes and the second subcluster of computing nodes:
pinging the one or more computing nodes associated with the first subcluster of computing nodes and the second subcluster of computing nodes to determine whether a node-to-node connectivity exists therebetween; and
detecting the restoration of connectivity based on the pinging.

11. A system, comprising:
one or more non-transitory computer-readable storage media including instructions; and
one or more processors coupled to the storage media, the one or more processors configured to execute the instructions to:
access a cluster of computing nodes of one or more clusters of computing nodes executing on an edge site computing network, wherein the cluster of computing nodes comprises a plurality of follower computing nodes and at least one leader computing node;

detect an interruption to connectivity established between the at least one leader computing node and one or more of the plurality of follower computing nodes;

in response to detecting the interruption to connectivity established between the at least one leader computing node and one or more of the plurality of follower computing nodes within a same cluster, and while connectivity is established between the one or more of the plurality of follower computing nodes and one or more other computing nodes of the plurality of follower nodes within the same cluster, bifurcate the cluster of computing nodes into a first subcluster of computing nodes and a second subcluster of computing nodes; and in response to detecting a restoration of connectivity with respect to one or more computing nodes associated with the first subcluster of computing nodes and the second subcluster of computing nodes, recombining the first subcluster of computing nodes and the second subcluster of computing nodes.

12. The system of claim 11, wherein the instructions further comprise instructions to:

prior to detecting the interruption to connectivity, ping one or more of the plurality of follower computing nodes and the at least one leader computing node to determine whether a node-to-node connectivity exists therebetween.

13. The system of claim 11, wherein each of the first subcluster of computing nodes and the second subcluster of computing nodes comprises at least one follower computing node and a leader computing node.

14. The system of claim 13, wherein each of the first subcluster of computing nodes and the second subcluster of computing nodes comprises an edge operator configured to control and manage the at least one follower computing node and the leader computing node.

15. The system of claim 11, wherein the instructions further comprise instructions to:

subsequent to bifurcating the cluster of computing nodes into the first subcluster of computing nodes and the second subcluster of computing nodes:

receive an intent from a control plane configured to manage each of the one or more clusters of computing nodes;

instantiate the intent utilizing a first edge operator associated with the first subcluster of computing nodes; and instantiate the intent utilizing a second edge operator associated with the second subcluster of computing nodes.

16. The system of claim 15, wherein each of the first subcluster of computing nodes and the second subcluster of computing nodes is executing on the edge site computing network.

17. The system of claim 15, wherein the instructions further comprise instructions to execute, based on the intent, an application utilizing the first subcluster of computing nodes or the second subcluster of computing nodes.

18. The system of claim 11, wherein the one or more clusters of computing nodes comprises a plurality of clusters of computing nodes, and wherein the cluster of computing nodes comprises a first cluster of computing nodes, the instructions further comprise instructions to:

in response to detecting the interruption to connectivity, select a second cluster of computing nodes of the plurality of clusters of computing nodes, the second cluster of computing nodes having connectivity.

19. The system of claim 11, wherein the instructions further comprise instructions to:

prior to recombining the first subcluster of computing nodes and the second subcluster of computing nodes:

ping the one or more computing nodes associated with the first subcluster of computing nodes and the second subcluster of computing nodes to determine whether a node-to-node connectivity exists therebetween; and detect the restoration of connectivity based on the pinging.

20. A non-transitory computer-readable medium comprising instructions that, when executed by one or more processors of a computing system, cause the one or more processors to:

access a cluster of computing nodes of one or more clusters of computing nodes executing on an edge site computing network, wherein the cluster of computing nodes comprises a plurality of follower computing nodes and at least one leader computing node;

detect an interruption to connectivity established between the at least one leader computing node and one or more of the plurality of follower computing nodes;

in response to detecting the interruption to connectivity established between the at least one leader computing node and one or more of the plurality of follower computing nodes within a same cluster, and while connectivity is established between the one or more of the plurality of follower computing nodes and one or more other computing nodes of the plurality of follower nodes within the same cluster, bifurcate the cluster of computing nodes into a first subcluster of computing nodes and a second subcluster of computing nodes; and in response to detecting a restoration of connectivity with respect to one or more computing nodes associated with the first subcluster of computing nodes and the second subcluster of computing nodes, recombining the first subcluster of computing nodes and the second subcluster of computing nodes.

* * * * *